United States Patent
Unterweger et al.

(10) Patent No.: US 11,318,878 B2
(45) Date of Patent: May 3, 2022

(54) INTERFACES FOR COST EFFECTIVE VIDEO COMMUNICATION WITHIN ADVANCED VEHICLE HEADLAMP CIRCUITS

(71) Applicant: Infineon Technologies AG, Neubiberg (DE)

(72) Inventors: Gernot Unterweger, Latschach (AT); Tobias Schuster, Stuttgart (DE); Andrea Scenini, Montegrotto Terme (IT); Christof Michenthaler, Arnoldstein (AT)

(73) Assignee: Infineon Technologies AG, Neubiberg (DE)

( * ) Notice: Subject to any disclaimer, the term of this patent is extended or adjusted under 35 U.S.C. 154(b) by 184 days.

(21) Appl. No.: 16/601,230

(22) Filed: Oct. 14, 2019

(65) Prior Publication Data
US 2021/0107397 A1    Apr. 15, 2021

(51) Int. Cl.
| | |
|---|---|
| *B60Q 1/14* | (2006.01) |
| *H04N 9/69* | (2006.01) |
| *H05B 45/10* | (2020.01) |
| *G06V 20/56* | (2022.01) |

(52) U.S. Cl.
CPC ............. *B60Q 1/1407* (2013.01); *H04N 9/69* (2013.01); *H05B 45/10* (2020.01); *G06V 20/56* (2022.01)

(58) Field of Classification Search
CPC ........ B60Q 1/1407; B60Q 1/143; B60Q 1/16; H05B 45/10; H05B 45/14; H05B 45/69; G06K 9/00791
See application file for complete search history.

(56) References Cited

U.S. PATENT DOCUMENTS

| | | | |
|---|---|---|---|
| 2010/0030525 A1* | 2/2010 | Dong .................... | G06F 30/15 703/1 |
| 2013/0031212 A1* | 1/2013 | Enosaki .............. | H04L 12/4625 709/218 |
| 2018/0338095 A1* | 11/2018 | Aihara .................. | G06K 9/209 |
| 2020/0029052 A1* | 1/2020 | Murao .................... | H04N 9/69 |
| 2020/0079280 A1* | 3/2020 | Bonne .............. | H04L 12/40013 |
| 2020/0084854 A1* | 3/2020 | Bonne .................... | H05B 45/10 |
| 2020/0171900 A1* | 6/2020 | Pampattiwar .......... | H04B 3/542 |

* cited by examiner

*Primary Examiner* — Alexander H Taningco
*Assistant Examiner* — Pedro C Fernandez
(74) *Attorney, Agent, or Firm* — Shumaker & Sieffert, P.A.

(57) ABSTRACT

A circuit may be configured to control a vehicle headlamp comprising light emitting diodes (LEDs). The circuit may comprise an LED controller configured to receive video data from a video source via a first interface; an LED driver configured to drive the LEDs based at least in part on the video data; and a second interface between the LED controller and the LED driver, wherein the second interface is configured to communicate the video data from the LED controller to the LED driver and wherein the second interface communicates the video data at a slower data rate than the first interface.

26 Claims, 10 Drawing Sheets

INTERFACES FOR COST EFFECTIVE VIDEO COMMUNICATION WITHIN ADVANCED VEHICLE HEADLAMP CIRCUITS

TECHNICAL FIELD

This disclosure relates circuits for driving and controlling light emitting diodes.

BACKGROUND

Drivers are often used to control a voltage, current, or power at a load. For instance, a light emitting diode (LED) driver may control the power supplied to a string of light emitting diodes. Some drivers may comprise a DC to DC power converter, such as a buck-boost, buck, boost, or another DC to DC converter. Such DC to DC power converters may be used to control and possibly change the power at the load based on a characteristic of the load. DC to DC power converters may be especially useful for LED drivers to regulate current through LED strings.

Some LED circuits include a large number of individually controllable LEDs arranged in a two-dimensional matrix. The individually controllable LEDs can be driven so as to provide advanced lighting effects. Advanced vehicle headlamp systems, for example, are one example application of such LED circuits, whereby advanced lighting effects associated with vehicle operation can be used to improve the driving experience and to promote vehicle safety.

SUMMARY

In general, this disclosure is directed to circuits within advanced vehicle headlamp systems. The circuits may be used to control and drive light emitting diodes (LEDs) with advanced lighting effects. In particular, the circuits may control and drive LED's so as to achieve glare reductions perceived by the operators of other vehicles, to enhance illumination of one or more objects, to adjust or project visual aids or guiding elements in order to help the vehicle operator, to project one or more symbols, to project guiding lines for the vehicle operator, to shape light projected by the LEDs, to reduce light intensity of a portion of light projected by the LEDs, or to achieve other effects. Such light adjustments may be performed based on navigation information collected or presented by the vehicle, based on object detection, or based on other factors. The vehicle may be equipped with cameras that can capture real-time video, which can be processed to perform such object detection. According to this disclosure, the interfaces used to communicate video data between various units outside of the vehicle headlamp and within the vehicle headlamp can be defined to promote reliable and effective operation, while simplifying the system and saving on component costs.

In one example, this disclosure is directed to a circuit configured to control a vehicle headlamp comprising LEDs, the circuit comprising: an LED controller configured to receive video data from a video source via a first interface; an LED driver configured to drive the LEDs based at least in part on the video data; and a second interface between the LED controller and the LED driver, wherein the second interface is configured to communicate the video data from the LED controller to the LED driver and wherein the second interface communicates the video data at a slower data rate than the first interface. The second interface may be defined to promote reliable and effective data communication without the need for an ultra-high-speed video communication, which can simplify the circuit and save on circuit component costs.

In another example, this disclosure is directed to a headlamp unit for a vehicle, the headlamp unit comprising: a set of LEDs, and a circuit configured to control the LEDs. The circuit may comprise an LED controller configured to receive video data from a video source via a first interface; an LED driver configured to drive the LEDs based at least in part on the video data; and a second interface between the LED controller and the LED driver, wherein the second interface is configured to communicate the video data from the LED controller to the LED driver and wherein the second interface communicates the video data at a slower data rate than the first interface. Again, the second interface may be defined to promote reliable and effective data communication without the need for an ultra-high-speed video communication, which can simplify the circuit and save on circuit component costs.

In yet another example, this disclosure describes an adaptive vehicle lighting system comprising: one or more camera sensors configured to capture video data associated with a scene illuminated by the vehicle lighting system; a graphics processing unit (GPU) that processes the video data; a first interface; and a headlamp unit. The headlamp unit may comprise a set of LEDs, and a circuit configured to control the LEDs, the circuit comprising: an LED controller configured to receive the processed video data from the GPU via the first interface; an LED driver configured to drive the LEDs based at least in part on the processed video data; and a second interface between the LED controller and the LED driver, wherein the second interface is configured to communicate the processed video data from the LED controller to the LED driver and wherein the second interface communicates at a slower data rate than the first interface. The second interface may comprise a lower cost interface than the first interface, while still providing reliable and effective video data communication necessary between the LED controller and the LED driver.

In still another example, this disclosure describes a system comprising a video signal source module comprising a video signal source, a first transceiver, and a first interface configured to communicate video data from the signal source to the first transceiver. The system may also include a second interface configured to communicate the video data from the first transceiver to a second transceiver, wherein the second interface communicates the video data at a faster data rate than the first interface. In addition, the system may include a video signal receiver module comprising the second transceiver, a circuit configured to control LEDs, and a third interface configured to communicate the video data from the second transceiver to the circuit, wherein the third interface communicates the video data at a slower data rate than the second interface. In this example, the video source module and the video signal receiver module may communicate between one another via a multi-wire differential interface, such as a controller area network (CAN) bus or another type of differential communication interface. The first and third interfaces, however, may comprise one-wire unidirectional interfaces that operate according to a master-slave protocol. Within such modules, reliable and effective video data communication can be achieved with the one-wire unidirectional interface at a lower system cost than would be otherwise be achieved if differential interfaces were used within the modules.

Details of these and other examples are set forth in the accompanying drawings and the description below. Other features, objects, and advantages will be apparent from the description and drawings, and from the claims.

DETAILED DESCRIPTION

This disclosure is directed to circuits useful for advanced vehicle headlamp systems. The circuits may be used to control and drive light emitting diodes (LEDs) with advanced lighting effects. Moreover, the circuits may include interfaces that are configured to promote cost effective video communication within the advanced vehicle headlamp systems.

The circuits may control and drive LED's so as to achieve glare reductions perceived by the operators of other vehicles, to enhance illumination of one or more objects, to adjust or project visual aids or guiding elements in order to help the vehicle operator (e.g., to present guiding elements on the road), to project one or more symbols, to project guiding lines for the vehicle operator (e.g., to present guide lines on the road), to shape light projected by the LEDs, to reduce light intensity of a portion of light projected by the LEDs, to present symbols, images, or trademarks during vehicle startup or vehicle idle, or to achieve other effects. Such light adjustments may be performed based on navigation information collected or presented by the vehicle, based on object detection, or based on other factors. The vehicle may be equipped with cameras that can capture real-time video, which can be processed to perform such object detection. According to this disclosure, the interfaces used to communicate video data between various units outside of the vehicle headlamp and within the vehicle headlamp can be defined to promote reliable and effective communication of video data, while simplifying the system and saving on component costs.

Figure 1:
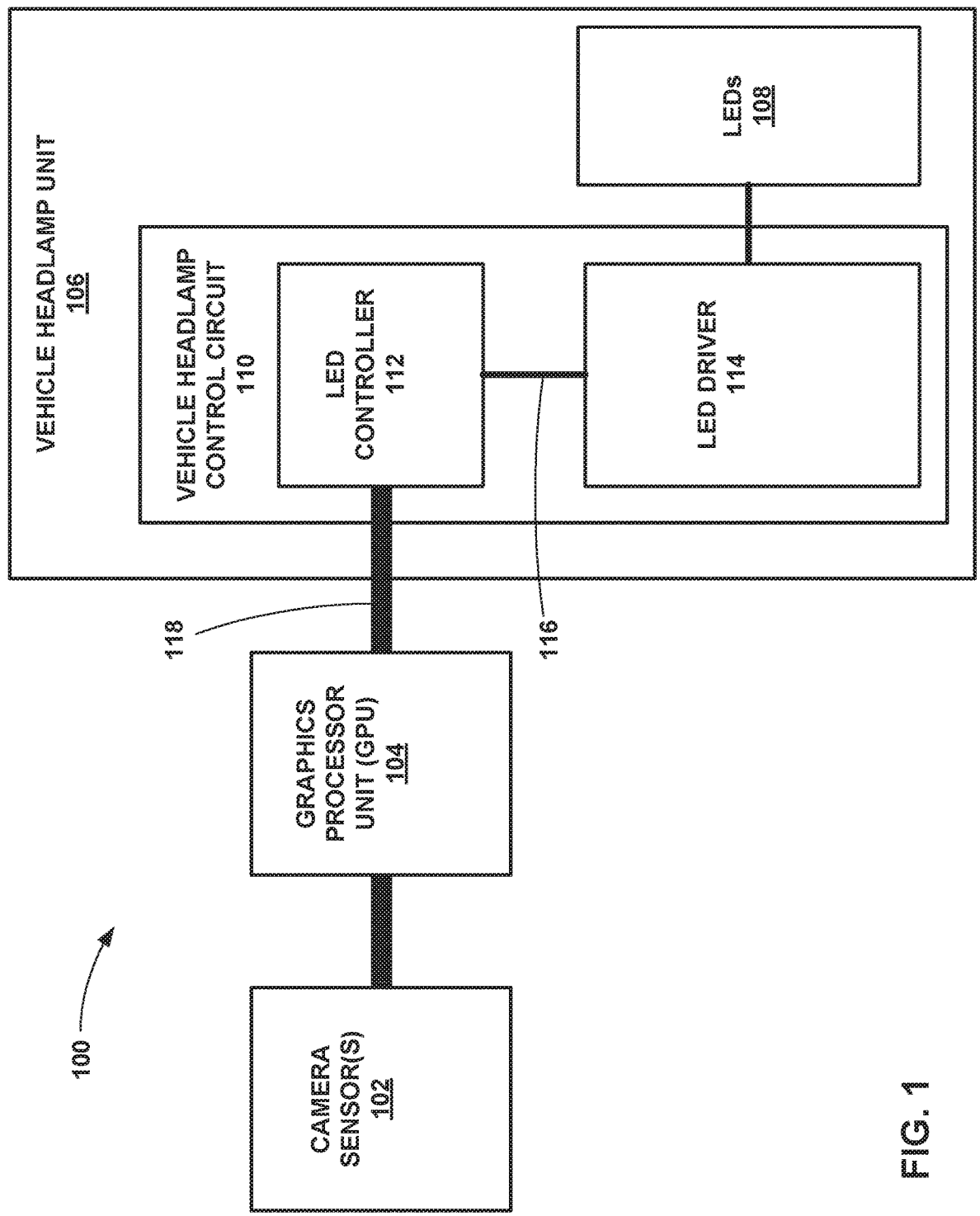
FIG. 1 is a block diagram illustrating a system that captures and delivers video information to a vehicle headlamp control circuit that controls light emitting diodes (LEDs).

FIG. 1 is block diagram illustrating a system that captures and delivers video information to a vehicle headlamp control circuit that controls light emitting diodes LEDs. In particular, FIG. 1 illustrates an adaptive vehicle lighting system 100 comprising one or more camera sensors configured 102 to capture video data associated with a scene illuminated by the vehicle lighting system, a graphics processing unit (GPU) 104 that processes the video data, and a vehicle headlamp unit 106 including a set of LEDs 108 that may be arranged in a two-dimensional matrix, and a vehicle headlamp control circuit 110 configured to control the LEDs 108.

Vehicle headlamp control circuit 110 may comprise an LED controller 112 configured to receive the processed video data from the GPU a first interface 118, which may comprise high speed video interface, or a differential interface commonly used in automobile circuit applications. Vehicle headlamp control circuit 110 may further comprise an LED driver 114, such as a DC-DC converter or other power device that is configured to drive the LEDs based at least in part on the processed video data.

GPU 104 may process raw video data and generate processed video data that is processed so as to achieve desired lighting effects by LEDs. Such processing by GPU 104, for example, may be based on navigation information collected or presented by the vehicle, based on object detection, or based on other factors. For example, camera sensors 102 may deliver real time video in raw format to GPU 104, and GPU may process the raw video to identify scenes, roadways, features, obstacles, or other elements within the raw video data. In some examples, GPU may perform one or more object detection algorithms on the raw video data in order to identify objects or elements within the video data captured by camera sensors 102. Based on such object detection algorithms, GPU 104 may modify the raw video data so as to generate processed video data, and the processed video data may be modified relative to the raw video data in a way that can achieve desired lighting effects by LEDs 108.

For example, object detection may be used to identify oncoming traffic, road hazards, or obstacles. Such object detection may be used to modify the raw video data such that the processed video data has pixelated data adjustments relative to the raw video data. The pixelated data adjustments may adjust the raw video data in places where objects are detected in the field of view. In this way, the processed data itself may be changed in a way that can help to achieve lighting effects by LEDs 108, such as glare reductions perceived by the operators of other vehicles, illumination of one or more objects, presentation of visual aids or guiding elements in order to help the vehicle operator projections of one or more symbols, projections of guiding lines for the vehicle operator, light shaping, reductions in light intensity, presentation of symbols, shapes or symbols, or the presentation of other effects. Other desirable lighting effects may also include the illumination of Trademarks or symbols, such as for presenting the driver with a welcome message or lighting effects when the vehicle is started or when the vehicle is in a parked mode.

Referring again to the object detection, GPU 104 may process raw video data and identify oncoming traffic in the raw video data. In this case, such objects may be used to cause specific pixelated intensity reductions such that LEDs 108 achieve glare reductions to the oncoming traffic. As another example, GPU 104 may process raw video data to identify an object or road hazard, such as on animal on the roadway, and in this case, objects may be used to cause specific pixelated intensity increases such that LEDs 108 illuminate the object with more light. The raw video data may comprise as a bit-map of RGB intensity values, and the processed video data may comprise a similar bit map of RGB intensity values that includes intensity adjustments to those pixels associated with the object detection.

Although RGB intensity values are discussed herein with regard to the video data, other video data formats could be such, such as formats that use chrominance and luminance values, LUV formats, CMYK formats, vectorized video data formats, or other video data formats. A bitmap of intensity values can be viewed as a bitmap of a video image, and can also be viewed as a bitmap of intensity values used to drive individual pixels of a matrix of LEDs. Thus, by processing a bitmap of an image, GPU can essentially define a new bitmap of that image that is modified to achieve object detection, glare reduction, or other effects when that same bitmap is used to drive LEDs 108.

As mentioned above, first interface 118 may comprise high speed video interface, or a differential interface commonly used in automobile circuit applications. Examples of first interface 118 may include an ethernet interface; a gigabit multimedia serial link (GMSL) interface; a controller area network (CAN) bus interface; a controller area network-flexible data (CAN-FD) bus interface; an interface defined according to a FlexRay protocol; a link defined according to a low voltage differential signaling (LVDS) standard, such as FPD-Link, FlatLink, FPD-Link II, FPD-Link III, and OpenLDI; or a controller area network-extra-large (CAN-XL) bus interface.

In contrast to first interface 118, which communicates video data from the outside to vehicle headlamp unit 106, second interface 116 communicates video data within vehicle headlamp unit 106. Furthermore, this disclosure recognizes component costs savings that can be achieved by simplifying second interface 116 relative to first interface 118, while still achieving reliable and effective video data communication within vehicle headlamp unit 106.

In some examples, the second interface 116 communicates video data at a slower data rate than the first interface 118. For example, second interface 116 may comprise an interface that operates according to a master-slave protocol. In some examples, second interface 116 comprises a unidirectional interface. In some examples, second interface 116 comprises a single wire interface. In some examples, second interface 116 comprises one wire interface typically used to support video displays with less than 40,000 pixels. In some examples, second interface 116 sends video data row by row, whereas first interface 118 may send video data video frame-by-video frame. In some cases, second interface 116 comprises an asynchronous interface. In some examples, the data resolution (e.g., the bit depth) of video data sent over interface 116 may be lower than the data resolution (e.g., the bit depth) of video data sent or interface 118, but in other cases, the data resolution (e.g., the bit depth) may be the same for video data sent over first interface 118 and second interface 116.

In addition to the object detection or other processing that may be performed by GPU 104, in some examples, additional video data adjustments can be made, such as so-called Gamma corrections to the video data. In some examples, Gamma corrections are performed by GPU 104 after the initial processing of the video data discussed above. In some examples, Gamma corrections are performed by LED controller 112 after GPU 104 processing of the video data discussed above. And in still other examples, LED driver 114 may be configured to perform the Gamma corrections. Gamma corrections or other video data adjustments may be used to further improve the lighting that is achieved by LEDs 108. Processed and adjusted video data (e.g. data that is processed by GPU 104 and then adjusted with Gamma corrections) may still comprise a bit map of RGB intensity values (or other formats) that includes intensity adjustments to those pixels associated with the object detection, intensity adjustments to those pixels used for presenting guiding lines or guiding features, as well as Gamma correction adjustments. LED driver 114 may then use the processed and adjusted video data (e.g., a bitmap) to drive LEDs 108, which may comprise a matrix of LEDs having pixels that correspond to the intensity values defined in the bitmap of video data.

In some examples, GPU 104 is configured to process video data, LED driver 114 is configured to adjust the processed video data, and LED driver 114 is configured to drive the LEDs based at least in part on the processed and adjusted video data. In some examples, GPU 104 is configured to process and adjust the video data, and LED driver is configured to drive the LEDs based at least in part on the processed and adjusted video data. In some examples, GPU 104 is configured to process video data, LED controller 112 is configured to adjust the processed video data, and LED driver 114 is configured to drive the LEDs based at least in part on the processed and adjusted video data. In some examples, GPU 104 performs object detection to process the video data and LED driver 114 performs a Gamma Correction on the processed video data to adjust the processed video data. In still other examples, GPU 104 may perform object detection and Gamma corrections, before sending the processed and adjusted video data to LED controller 112.

Although not shown in FIG. 1, in some cases, vehicle headlamp control circuit 110 may also control additional devices or additional sets of lights, such as daytime running lights (DRLs). However, DRLs are not shown in FIG. 1 for simplicity. In still other cases, other circuits may control DRLs.

In some examples, this disclosure is directed to a vehicle headlamp unit 106 comprising a set of LEDs 108 and a vehicle headlamp control circuit 110 configured to control the set of LEDs 108. The set of LEDs 108 may comprise individually controlled LEDs arranged in a two-dimensional matrix. Vehicle headlamp control circuit 110 may comprise an LED controller 112 configured to receive video data from a video source via a first interface 118, and an LED driver 114 configured to drive the LEDs based at least in part on the video data. A second interface 116 between the LED controller 112 and LED driver 116 may be configured to communicate the video data from LED controller 112 to LED driver 114 at a slower data rate than the data rate of first interface 118.

Again, the set of LEDs 108 may comprise a matrix of individually controlled LEDs. LED driver 114 may be configured to control the intensity of different ones of the individually controlled LEDs based on the video data, such as by using a processed and adjusted bit map to define the intensity provided to each individual LED of the set of LEDs 108.

Video data received by LED controller 112 from a video source (such as GPU) may comprise processed video data that is based on raw video data from camera sensors 102 and object detection. Alternatively, in some cases, GPU 104 may be eliminated and raw video data (without processing or object detection may be sent directly from camera sensors 102 to LED controller, in which case the first interface 118 would define the interface directly between camera sensors 102 and LED controller 112 (not shown in FIG. 1).

Second interface 116 may be simplified relative to first interface 118 in order to save component cost, while still achieving reliable and effective communication of video data within vehicle headlamp unit 106. In some examples, second interface 116 may comprises a one-wire uni-directional interface, whereas first interface 118 may comprise a multi-wire differential interface. First interface 118 may comprise high speed video interface, or a differential interface commonly used in automobile circuit applications. Examples of first interface 118 may include an ethernet interface; a GMSL interface; a CAN bus interface; a CAN-FD bus interface; an interface defined according to a FlexRay protocol; a link defined according to a LVDS standard, such as FPD-Link, FlatLink, FPD-Link II, FPD-Link III, and OpenLDI; or a CAN-XL bus interface. In contrast, second interface 116 may comprise an interface that operates according to a master-slave protocol.

LED driver 114 may be configured to adjust video data, such as by performing a Gamma correction process on the processed video data, and the LED driver 114 may be configured to drive the set of LEDs 108 based at least in part on the adjusted video data. Prior to this, however, GPU 104 may perform one or more of the following processing steps on the video data: adjusting the video data based on navigation information; adjusting the video data to reduce glare of light projected by the LEDs based on object detection; adjusting the video data to enhance illumination of one or more objects illuminated by the LEDs based on object detection; adjusting the video data to project one or more guiding elements by the LEDs; adjusting the video data to project one or more symbols by the LEDs; adjusting the video data to project one or more guiding lines by the LEDs; adjusting the video data to shape light projected by the LEDs; and adjusting the video data to reduce intensity of at least a portion of light projected by the LEDs.

Figure 2:
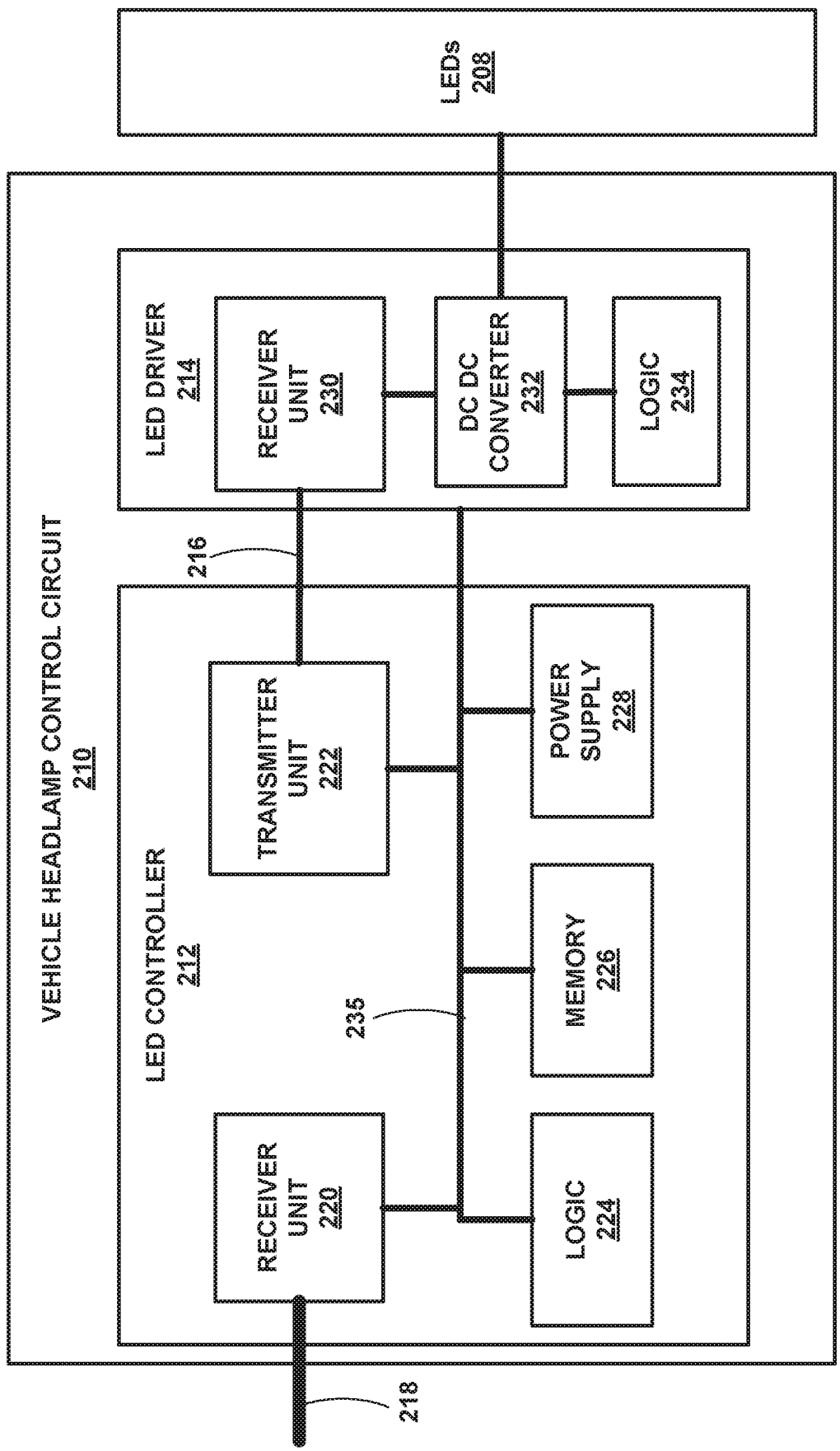
FIG. 2 is another block diagram illustrating exemplary details of a vehicle headlamp control circuit.

FIG. 2 is another block diagram illustrating exemplary details of a vehicle headlamp control circuit 200. In some examples, vehicle headlamp circuit 200 may illustrate a more detailed example of vehicle headlamp circuit 100 shown in FIG. 1, although vehicle headlamp circuit of FIG. 1 would also differ from circuit 200 in other examples.

In the example shown in FIG. 2, vehicle headlamp circuit 210 is configured to control a set of LEDs 208. In particular, vehicle headlamp circuit 200 includes an LED controller 212 and an LED driver. A first interface 218 delivers video data to LED controller 212 from an external source (such as directly from cameras, from a GPU, or from storage), and second interface 216 delivers video data from LED controller 212 to LED driver 214 within vehicle headlamp circuit 210. Second interface 216 may be defined to promote reliable and effective data communication without the need for an ultra-high-speed video communication, which can simplify the circuit and save on circuit component costs. Accordingly, second interface 216 may comprise a lower cost interface (possibly lower quality or lower speed interface) than the first interface 218, while still providing reliable and effective video data communication necessary between the LED controller and the LED driver.

LED controller 212 may include a receiver unit 220 configured to receive data from first interface 218 and a transmitter unit 222 configured to send data over second interface 216. Thus, receiver unit 220 and transmitter unit 222 may communicate using different communication protocols. LED controller 212 may include a power supply 228 for powering LED controller and possibly for powering LED driver 214. LED controller 212 may also include memory 226 for storing or buffering video data or other data or instructions, and logic 224 (or a processor) for performing functions related to LED control. The components of LED controller 212 may be communicatively coupled to one another, such as via CAN bus 235, or another type of data bus 235 or one or more communication interfaces.

LED driver 214 may include a receiver unit 230 configured to receive video data from second interface 216. In addition, LED driver 214 may include a DC DC converter 232 configured to regulate current through LEDs 208, and logic 234 (or a processor) for performing functions related to driving or controlling LEDs 208.

In some examples, vehicle headlamp circuit 210 is configured to control a vehicle headlamp comprising LEDs 208. LED controller 212 may be configured to receive video data at receiver unit 220 from a video source that sends such data via first interface 218. LED driver 214 may be configured to drive LEDs 218 based at least in part on the video data. Second interface 216 between the LED controller 212 and LED driver 214 is configured to communicate the video data from transmitter unit 222 of LED controller 212 to receiver unit 230 LED driver 214. In some cases, second interface 216 communicates the video data at a slower data rate than first interface 218 so as to reduce the component costs associated with second interface 216 inside vehicle control circuit 210, while still achieving effective and reliable data communication needed for controlling advanced vehicle headlamps.

LEDs 208 may comprise a matrix of individually controlled LEDs, and LED driver 214 is configured to control the intensity of different ones of the individually controlled LEDs based on the video data. In particular, DC DC converter 232 may be configured to regulate current through the individually controlled LEDs within LEDs 208. LED controller 212 may control the regulation of current by controlling DC DC converter 232, or in some cases, logic 234 may be configured to control DC DC converter 232 based on information received from LED controller 212. The various processing and adjustments to video data (such as object detection, Gamma corrections, or other processing) may be performed by an external GPU, by logic 224 of LED controller 212, or by logic 234 of LED driver 214. In some examples, object detection is performed by an external GPU and Gamma corrections to the video data are performed by logic 224 of LED controller 212 or by logic 234 of LED driver 214.

Video data may be captured by external cameras (not shown in FIG. 2), and possibly processed by a GPU (not shown in FIG. 2). The video data may comprise real-time video data associated with a scene illuminated by LEDs 218, and the video data may be communicated from a video source (cameras or the GPU) to LED controller 212 via first interface 218. If sent from a GPU, for example, the video data received by LED controller 212 via first interface 218 may comprise processed video data that is based on raw video data and object detection.

In some examples, second interface 216 may comprise a one-wire uni-directional interface, which may be well suited for video data communication within a circuit. In contrast, first interface comprises a multi-wire differential interface, which may be well suited for video data communication between circuits. Different protocols may be used for communicating data over first interface and second interface, and different video data formats may be used. Video data compression (encoding and decoding) may also be performed at one or more stages of the data communication, in which case encoders and decoders (not shown) may be used by receiver units and transmitter units. However, video data compression may also be avoided, and this disclosure is not necessarily limited to any use or non-use of video data compression.

In some examples, first interface 218 communicates data video frame-by-video frame and second interface 216 communicates data row-by-row. In some cases, logic 224 of LED driver 212 may be configured to adjust the video data, and the LED driver 214 may be configured to drive the LEDs based at least in part on the adjusted video data. For example, logic 214 may adjust video data by performing a Gamma Correction process on the video data. Or alternatively, logic 234 of LED driver 214 may be configured to perform the Gamma Correction process on the video data.

As examples, first interface 218 may comprise an ethernet interface; a GMSL interface; a CAN bus interface; a CAN-FD bus interface; an interface defined according to a FlexRay protocol; a link defined according to an LVDS standard, such as FPD-Link, FlatLink, FPD-Link II, FPD-Link III, and OpenLDI; or a CAN-XL bus interface. Moreover, first interface 218, in some examples, may comprise a bi-directional interface and/or a differential two-wire interface. In contrast to first interface 218, second interface 216 may comprises an interface that operates according to a master-slave protocol. In some examples, second interface 216 comprises a uni-directional one-wire interface.

Although not shown in FIG. 2, in some cases, vehicle headlamp control circuit 210 may also control additional devices or additional sets of lights, such as daytime running lights (DRLs). For example, LED controller 212 may coordinate DRLs, along with LEDs 208, and a separate driver may be used for DRLs. Or LED controller 212 may coordinate DRLs and driver 214 may be used to drive the DRLs in addition to driving LEDs 208. However, DRLs are not shown in FIG. 2 for simplicity. In still other cases, other circuits may control DRLs.

Figure 3:
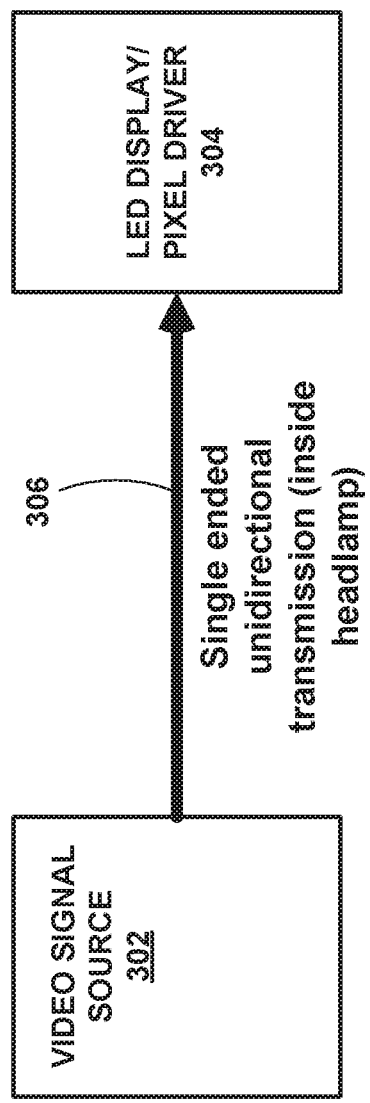
FIG. 3 is a general block diagram showing single ended unidirectional communication of video information inside a vehicle headlamp unit.

FIG. 3 is a general block showing single ended unidirectional communication of video information inside a vehicle headlamp unit. A video signal source 302 captures, processes, or stores real-time video data, and the video data is communicated to LED display or pixel driver 304 via a single ended unidirectional transmission interface 306, which may reside inside a vehicle headlamp. Interface 306 may be similar to second interface 116 (FIG. 1) or second interface 216 (FIG. 2) described above. Interface 306 may be configured to promote reliable and effective data communication without the need for an ultra-high-speed video communication, which can simplify the circuit and save on circuit component costs.

Figure 4:
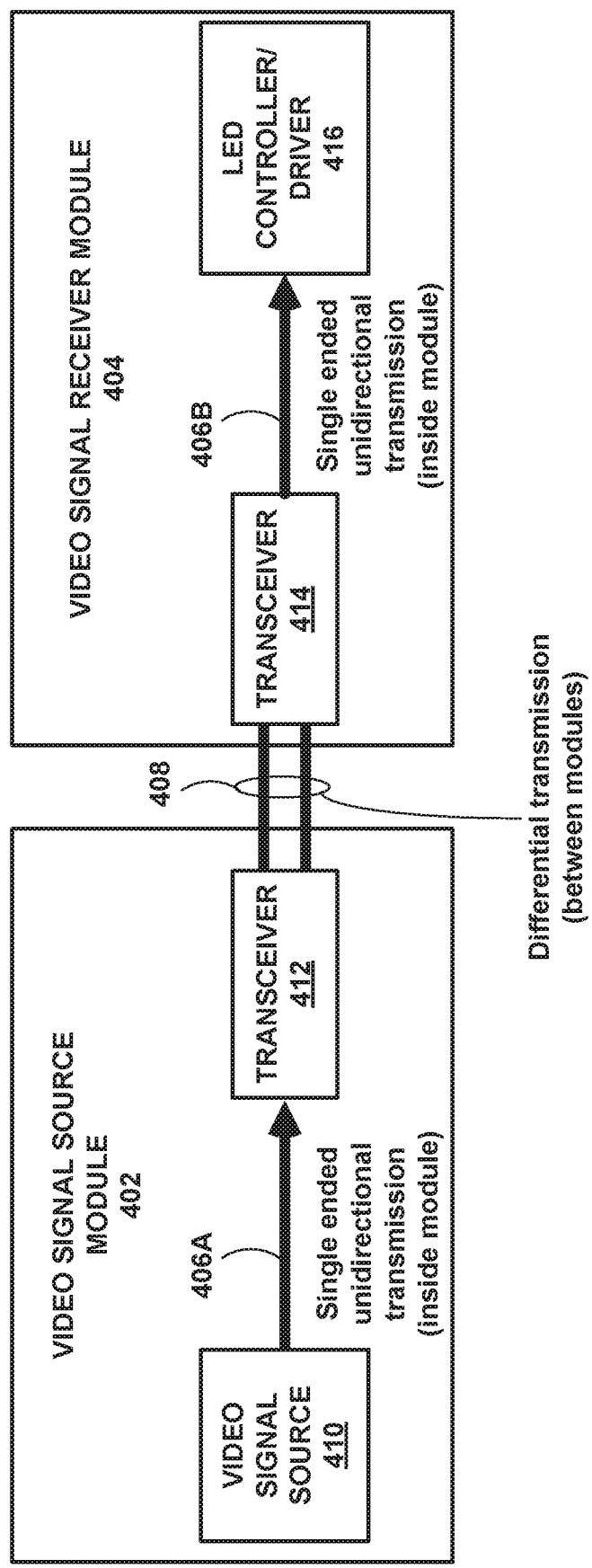
FIG. 4 is a block diagram showing single ended unidirectional communication of video information inside a video signal source module, single ended unidirectional communication of video information inside a video signal receiver module, and differential communication of video information between the video signal source module and the video signal receiver module.

FIG. 4 is a block diagram showing a video signal source module 402 that is communicatively coupled to a video signal receiver module 404 via a first interface 408. In some examples, video signal source module 402 and video signal receiver module 404 may each comprise separate circuit packages that include circuits that are packaged for modular connection to other circuit packages or for mounting on circuit boards, and first interface 408 may comprise an external interface that facilitate communication between the modules. In some cases, video signal source module 402 and video signal receiver module 404 may comprise so-called "flip-chips" configured for flip-chip style installation on a circuit board. In some examples, transceiver 412, transceiver 414, and LED controller/driver 416 may all comprise flip chips. In any case, the techniques of this disclosure may be very useful for modular design of circuits, enabling low-cost one-way video communication between some modules and higher quality differential communication between other modules. In some cases, for example, it may be desirable to facilitate low-cost one-way video communication between circuit modules that reside within a given circuit package (e.g, within a common housing), and to facilitate and higher quality differential communication between modules that reside in different circuit packages (e.g., within different housings).

Video signal source model 402 may comprise video signal source 410, such one or more cameras, a GPU, memory, or another source of video data. Video signal source model 402 may also include a transceiver 412. Video signal source 410 may communicate video data to transceiver 412 via a signal ended unidirectional communication over a second interface 406A which may comprise a single wire interface that is internal to a circuit package associated with video signal source module 402. Second interface 406A, for example, may be similar to second interface 116 (FIG. 1) or second interface 216 (FIG. 2) described above.

Video signal receiver module 404 may also include a transceiver 414. In addition, video signal receiver module 404 may include an LED controller/driver 416, which may represent a separate controller and driver or a combined controller and driver.

Transceiver 414 of video signal receiver module 404 may communicate video data to LED controller/driver 415 via a signal ended unidirectional communication over third interface 406B. Third interface 406B (like second interface 406A) may be similar to second interface 116 (FIG. 1) or second interface 216 (FIG. 2) described above. Second and third interfaces 406A and 406B may be internal to the respective circuit modules and may be fully housed or contained within respective circuit packages. Inside the modules, second and third interfaces 406A and 406B may be configured to promote reliable and effective data communication without the need for an ultra-high-speed video communication, which can simplify the circuit and save on circuit component costs. If the components of LED controller/driver 416 are separate (i.e. separate modules or packages), the separate driver and controller modules may also have yet another internal interface that is similar to interface 406B.

According to FIG. 4, video data communication within video signal source module 402 and video signal receiver module 404 is signal ended unidirectional communication over internal interfaces 406A and 406B. In contrast, according to FIG. 4, video data communication between video signal source module 402 and video signal receiver module 404 is differential communication. In particular, first interface 408 may comprise a differential two wire interface configured to support high speed reliable data communication between video signal source module 402 and video signal receiver module 404.

In one example, the system shown in FIG. 4 comprises a video signal source module 402 comprising a video signal source 410 and a first transceiver 412. The system of FIG. 4 may also include a video signal receiver module 404 comprising a second transceiver and a circuit (e.g., LED controller/driver 416) that is configured to control LEDs. The system of FIG. 4 may also include a first interface 408 configured to communicate the video data between video signal source module 402 and video signal receiver module 404, e.g., from first transceiver 412 to second transceiver 414. Video signal source module 402 may include a second interface 406A within video signal source module 402, wherein the second interface 406A is configured to communicate video data from the video signal source 410 to the first transceiver 412. Similarly, video signal receiver module may include a third interface 406B within the video signal receiver module 404, wherein the third interface 406B is configured to communicate the video data from the second transceiver 414 to the circuit configured to control LEDs (e.g., LED controller/driver 416). In some examples according to this disclosure, the first interface 408 communicates the video data at a faster data rate than the second interface 406A, and the first interface 408 communicates the video data at a faster data rate than the third interface 406B. The second and third interfaces 406A and 406B may comprise one-wire unidirectional interfaces that operate according to a master-slave protocol, and the first interface 408 may comprise a multi-wire differential interface. In other examples, first interface 408, second interface 406A, and third interface 406 may operate at similar speeds (such as according to a common clock), but first interface 408 may be differential and two-directional whereas second interface 406A and third interface 406 may be single-directional (and in some cases second interface 406A and third interface 406 may comprise a single wire).

Figure 5:
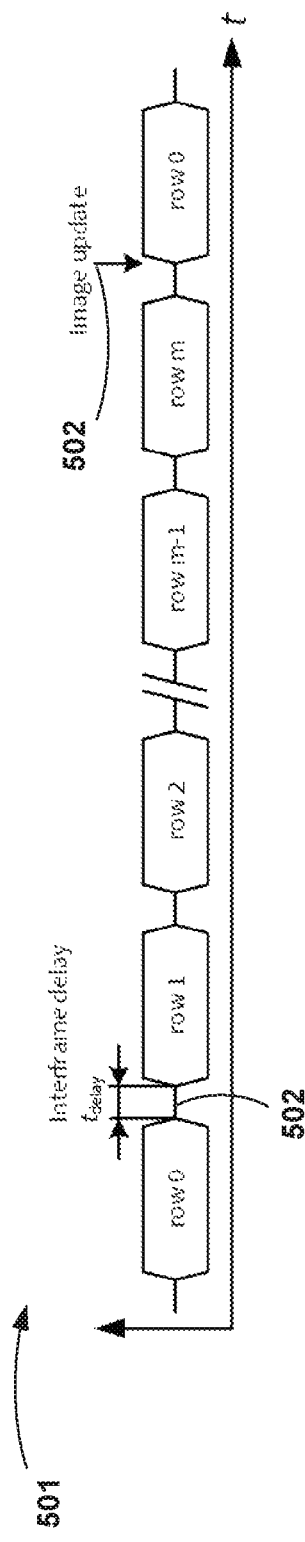
FIG. 5 is a conceptual diagram illustrating an exemplary video data format that may be useful for single ended unidirectional communication of video information.

FIG. 5 is a conceptual diagram illustrating an exemplary video data format that may be useful for single ended unidirectional communication of video information. Video stream 501 may comprise a consecutive stream of single pictures with a given frame rate (e.g. 10 Hz, 15 Hz, 20 Hz, 24 Hz, 30 Hz or 60 Hz). Video stream 501 may conform to a video data protocol used for a low-cost video interface. The video data may be transmitted row-by-row, with an interframe delay 502 encoded between each row. An image update 503 may also be encoded in stream 501 to signal the end of a video frame (the final row of that video frame) and the beginning of the next video frame (the first row of that next video frame. For example, interframe delay 502 and image update 503 may be encode information using time delays between data, although bits or flags may also be used. A light source (e.g., LEDs driving by an LED driver) may update its image or bitmap used to drive the LEDs either row by row or once a full image after an entire image is received (e.g., where the image includes m rows).

Figure 6:
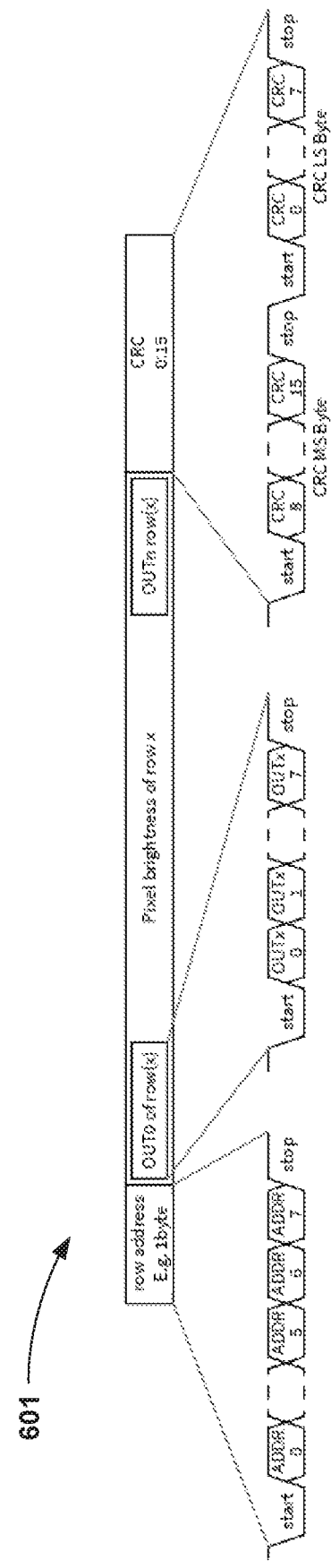
FIG. 6 is a conceptual diagram illustrating an exemplary bitstream for one row of video data.

FIG. 6 is a conceptual diagram illustrating an exemplary bitstream for one row of video data. As illustrated, one row of video information 601 may be communicated using the data fields that include a master break, a row address (e.g., ADDR), pixel brightness data of each individual pixel (e.g., OUTx), and a data integrity check (e.g., CRC). The master break may be optional to signal breaks between rows. For example, a row may comprise one or two bytes that allow the addressing of each individual row. Pixel brightness data may be encoded in n bytes of pixel data for each row (e.g., n=number of pixels per image row*resolution per pixel). As an example, there may be 200 pixels with 8 bits per pixel. Of course, the number of pixels as well as the number of bits used for each pixel could vary widely in different examples. In addition to the pixel data, the video information 601 may also include a data integrity check, such as data that facilitates a cyclic redundancy check (CRC), which may comprise 16 bits CRC data.

In some examples, the data stream may also be encoded with video compression algorithms, such as lossless or lossy encoding. Any of a wide variety of video compression standards may be used, but this may also require encoders and decoders, which may be undesirable for some applications. If compression is used, the compression may correspond to video compression standards or protocols such as: MPEG-2, MPEG-4, ITU-T H.263, ITU-T H.264/MPEG-4, Part 10, Advanced Video Coding (AVC), ITU-T H.265/High Efficiency Video Coding (HEVC), Theora, RealVideo RV40, VP9, AV1, the Versatile Video Coding (VVC) currently under development, and extensions of such standards.

Also, in order to enable higher duty cycle/brightness resolutions with the same transmission speed per pixel an additional look up table can be added for post processing of the transmitted data, which may provide a very low cost way to reduce data without requiring full compression according to a standard. In some cases, entropy coding is applied by the transmitter unit and receiver unit (e.g., 222 and 230 of FIG. 2) associated with a given interface, without encoding compression according to a standard.

Figure 7:
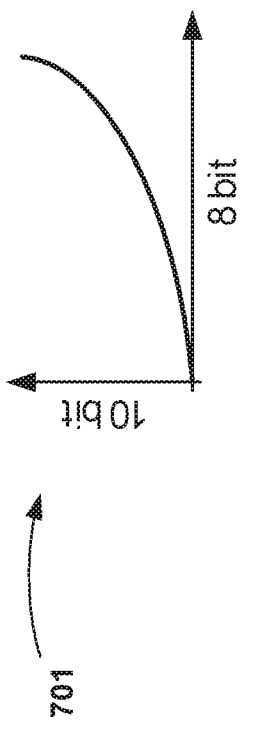
FIG. 7 is a graph showing an exemplary Gamma Correction curve that may be applied by a headlamp control circuit to help compensate LED brightness relative to perceived brightness of the human eye.

FIG. 7 is a graph showing an exemplary Gamma Correction curve 701 that may be applied by a headlamp control circuit to help compensate LED brightness relative to perceived brightness of the human eye. In the example shown in FIG. 7, for each n-bit value, a brightness value with higher resolution is assigned. As the human eye is more sensitive to changes in the low brightness area, more bit values are placed there. Choosing a non-linear shape for encoding 10-bit values into 8-bit values may add an additional Gamma Correction to compensate the LED brightness so as to better account for the perceived brightness of the human eye. The uneven distribution (high coverage at low duty cycle and lower coverage at high duty cycles) of the assigned duty cycle allows a lower data length to be transmitted for each pixel (e.g. 8-bit instead of 10-bit) without significant loss of configurability of the light. As noted above, Gamma corrections may be applied by a GPU, by an LED controller, or by logic of an LED driver.

Furthermore, in order to ensure a valid video data transmission, several data integrity check measures can be embedded in the protocol as well as the protocol handler such as: frame check validating the correct length of received bit stream, CRC or one counter checksums (e.g. at the end of each row) to validate the received data and allow a correction in case of errors within the received data, and watchdog monitoring of any bus or interface timeouts.

A low cost one wire interface may be defined as a point to point communication only, which may not follow other standard protocol definitions such as CAN-protocol. In this way, data overhead can be limited to the row address and the checksums for data validation.

A low cost one wire interface may operate asynchronously and may be based on a universal asynchronous receiver-transmitter (UART) interface. The synchronization to a frame can be done based on the interframe delay and the following start byte of each row that is transmitted. The data itself can be sent in portions or pixels (e.g. 8 bits or 16 bits embedded within a start bit (low) and a stop bit (high)). The row address can be used to synchronize the protocol to a new image. Timing synchronization can be performed using precise clock generators in the signal source and the light source, driver or controller that receives the image. In this case, the signal source and the light source, driver or controller can be sent the same interface operating frequency. On the receiver side, a receiver that receives video data may use sufficient oversampling to compensate for any small frequency deviations. The additional frame check may also be included data stream to ensure that invalid frames caused by wrong frequency settings are ignored.

Figure 8:
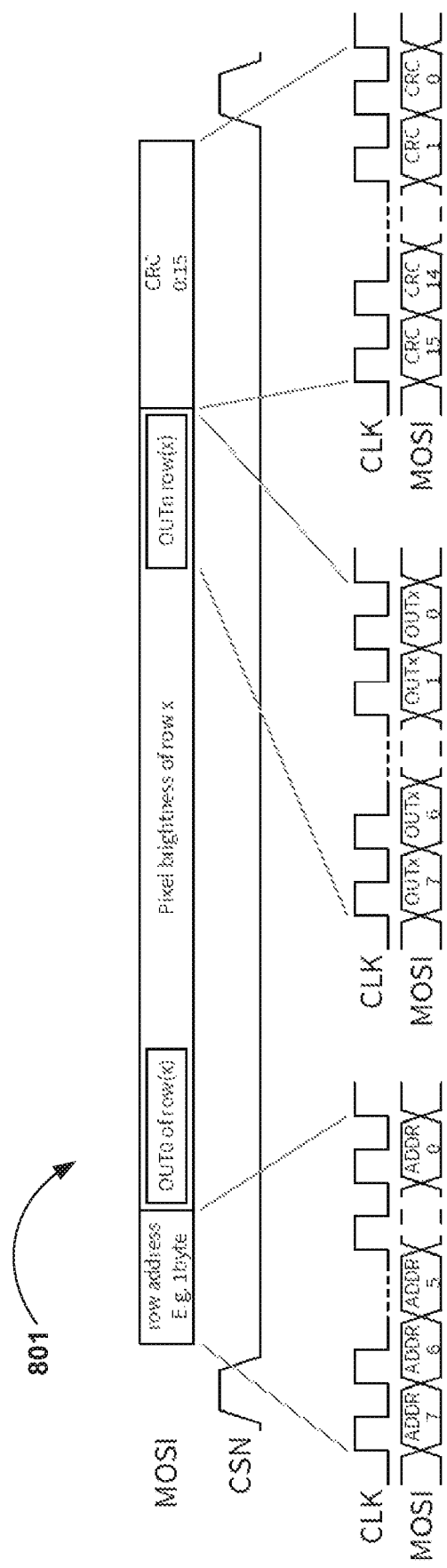
FIG. 8 is another conceptual diagram illustrating an exemplary bitstream for one row of video data, where the video interface also includes a clock line.

FIG. 8 is another conceptual diagram illustrating an exemplary bitstream 801 for one row of video data, where the video interface also includes a clock line. In order to add more robustness and to remove the need for the additional precise oscillator, a low-cost interface unidirectional interface may be extended to include a clock line and optionally also an update line. This type of extension illustrated in FIG. 8 may enable the usage of higher data rates (e.g. up to 25 Mbaud) and may remove the need for precise oscillators on receiver and transmitter side. In FIG. 8, CSN may refer to "Chip select NOT," MOSI may refer to "Master Out Slave In" and MISO may refer to "Master In Slave Out" (which may refer to reverse communication that is not necessarily used for many examples of this disclosure) As shown, for example, a CSN clock signal may be used signal a new row, and CLK clock signals may be used to signal each address (ADDR), pixel brightness data of each individual pixel (OUTx) and CRC data. Additionally, in the example of FIG. 8, no start and stop bits are needed after each 8 bit or 16 bit data field, and for this reason, net bandwidth can be increased. Consistent with FIG. 8, in some examples, a low-cost interface may comprise a multi-wire unidirectional interface, such as a 2-wire, a 3-wire interface, or a 4-wire interface. The unidirectional interface, for example, may include a data line, a clock line, and a chip select line such as a CSN.

Figure 9:
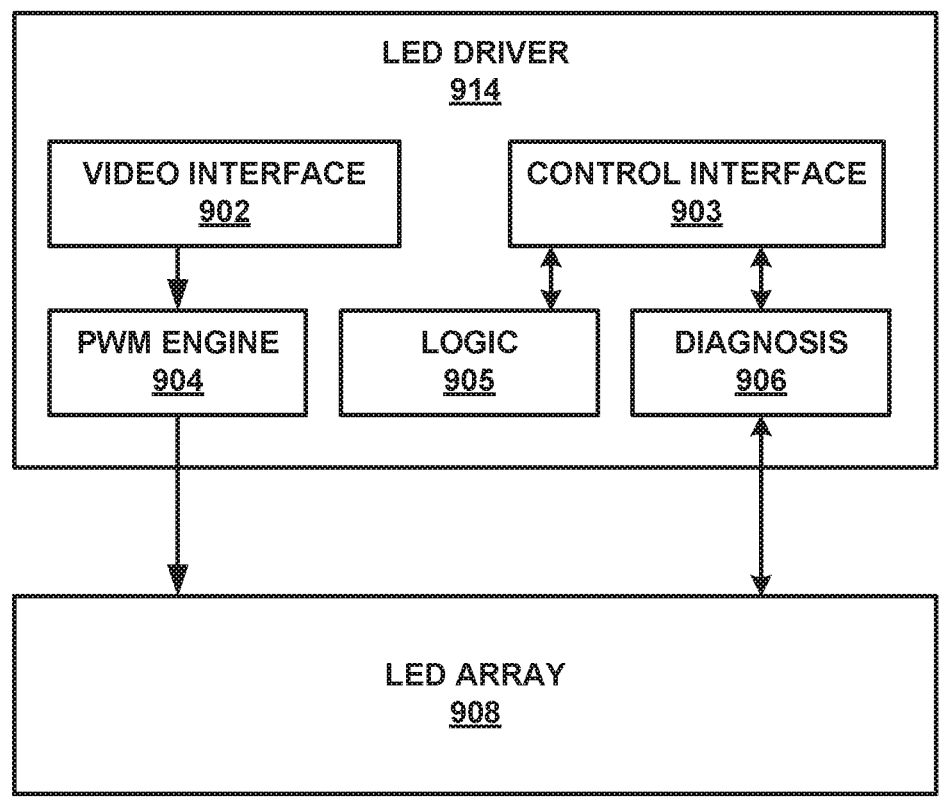
FIG. 9 is a block diagram of an exemplary LED driver for driving an LED array.

FIG. 9 is a block diagram of an exemplary LED driver 914 for driving an LED array 908. LED array 908 may comprise a two-dimensional array of individually controlled pixels and may include several thousand pixels in an application specific integrated circuit (ASIC). LED driver 914 may be supplied with 5 volts (supply not shown). LED driver 914 may comprise one example of other LED drivers described herein, although other types of LED drivers could be used. In the example of FIG. 9, LED driver includes a video interface 902, which may comprise a low-cost interface that is configured to receive video data from another circuit within a vehicle headlamp unit. Video interface may receive video frames (e.g., bit maps) that can be used to drive individual LEDs of LED array 908. In some examples, video interface 902 may receive continuous updates of real-time image data, e.g., at 24, 30, or 60 frames per second. PWM engine 904 may comprise one or more switches that are controlled to regulate current through each LED of LED array 908 so as to adapt the LED brightness according to video data received over video interface 902. The switches may be controlled by pulse width modulation (PWM) signals, although pulse density modulation (PDM) or other types of signal modulations may also be used.

Control interface 903 may perform other controls or adjustments to the video data and the LED array 908. Control interface 903 may comprise a low speed interface that operates at a speed greater than 2 megabits, such as an I2C interface or UART interface. Logic 905 may be included, such as for performing Gamma corrections on video data prior to such data being used by PWM engine 904 to drive LED array 908. In addition, control interface may control diagnosis circuitry 906 in order to monitor LED and circuit conditions, and diagnosis any problems with LED array.

Figure 10:
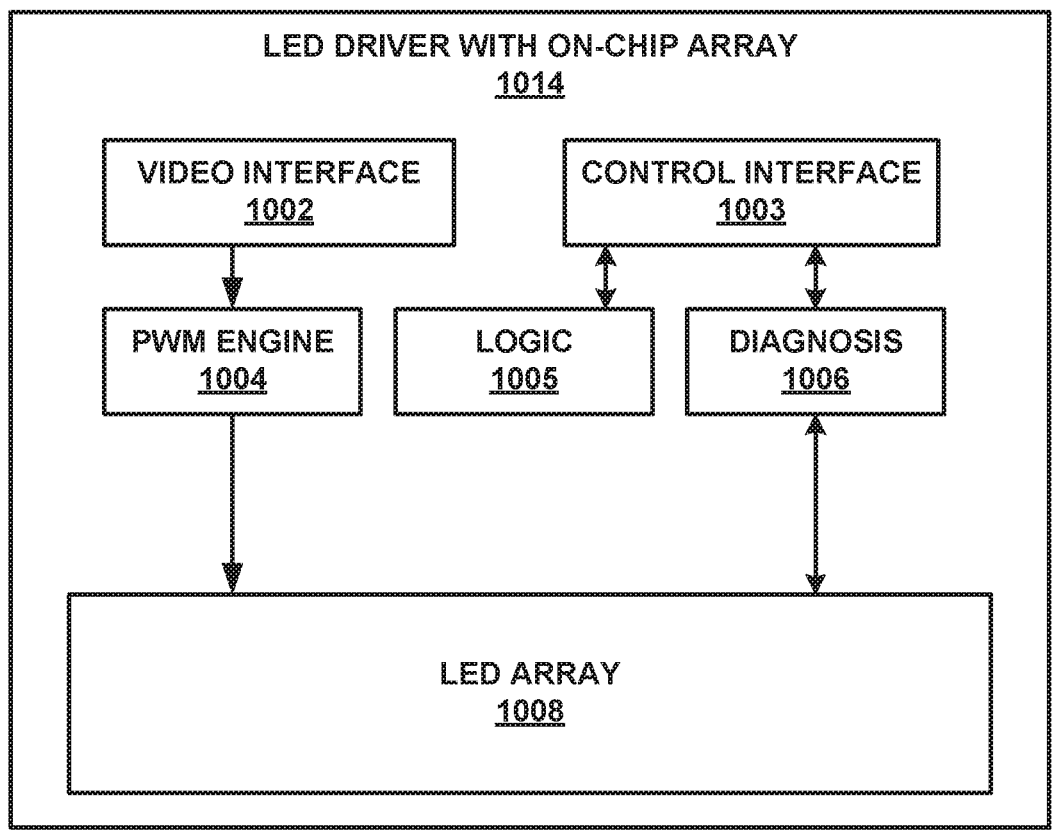
FIG. 10 is a block diagram of an exemplary LED driver that includes an on-chip LED array on the same integrated circuit (i.e., the same "chip") as the LED driver.

FIG. 10 is another block diagram showing an exemplary LED driver 1014 that includes an on-chip LED array 1008 on the same integrated circuit (i.e., the same "chip") as the LED driver. LED driver 1014 is very similar to LED driver 914 shown in FIG. 9. LED array 1008 may be similar to LED array 908. However, in FIG. 10, LED array 1008 is formed on the same integrated circuit as LED driver 1014. Moreover, all of the components shown in LED driver 1014, including LED array 1008, for example, may be formed in the same silicon structure, although other semiconductor materials may also be used, such as Gallium nitride. Otherwise, video interface 1002 may be similar to video interface 902, control interface 1003 may be similar to control interface 903, PWM engine 1004 may be similar to PWM engine 904, logic 1005 may be similar to logic 905, and diagnosis circuit 1006 may be similar to diagnosis circuit 906.

Figure 11:
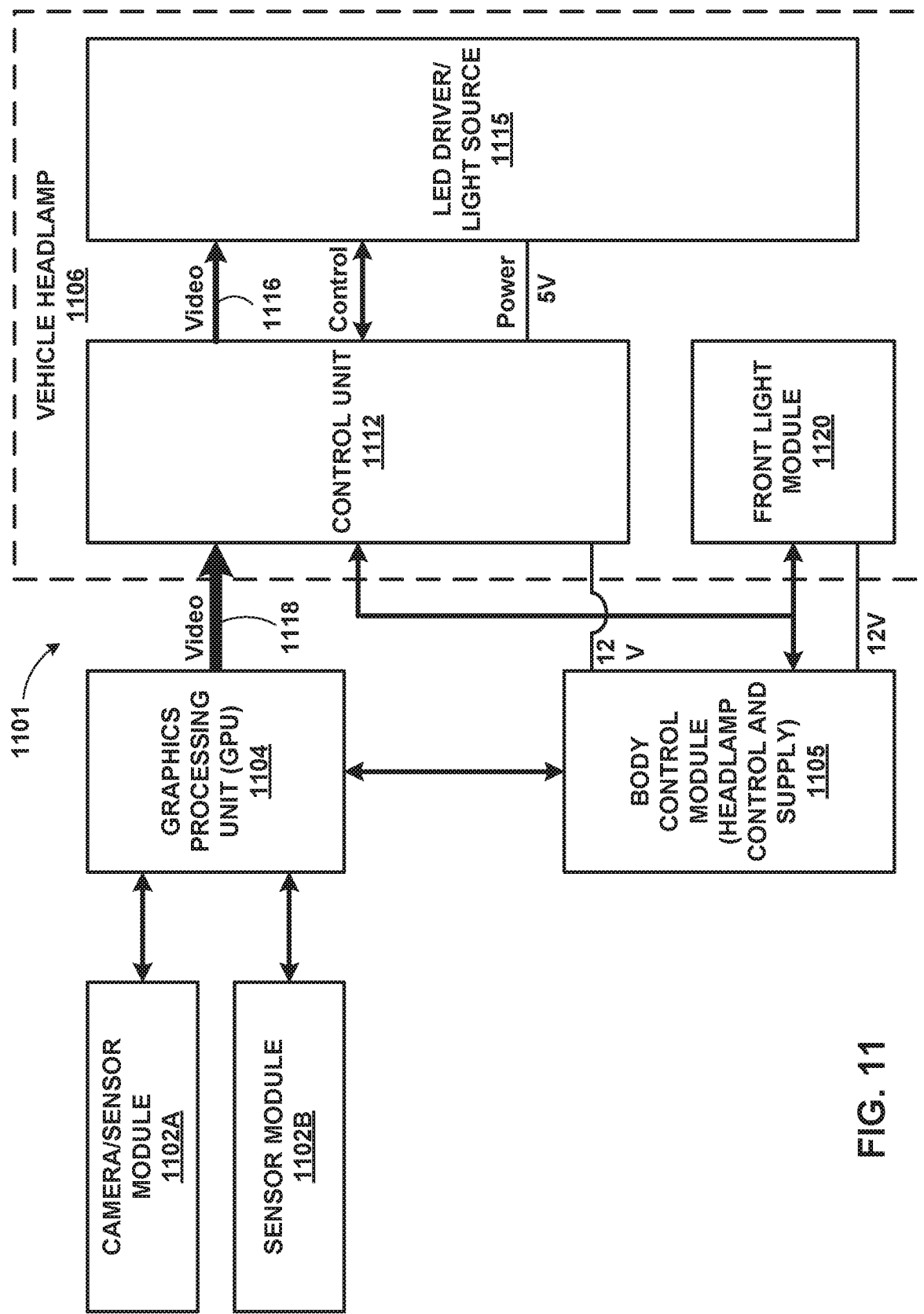
FIG. 11 is an exemplary system block diagram of an example vehicle headlamp system according to this disclosure.

FIG. 11 is an exemplary system block diagram of an example vehicle headlamp system according to this disclosure. In this example, the vehicle headlamp system 1101 includes camera/sensor module 1102A, sensor module 1102B, GPU 1104, body control module 1105, and vehicle headlamp unit 1116. Vehicle headlamp unit may comprise a control unit 1112, which may comprise an LED controller, a front light module 1120, and an LED driver/light source, which may comprise an LED driver that includes an on-chip LED array similar to that shown in FIG. 10.

Camera/sensor module 1102A may be located in the front of a vehicle and may be configured to capture real-time video of an area in front of the vehicle. Sensor module 1102B may generally refer to other cameras or sensors that may be useful for video-aided driving or self-driving of a vehicle. GPU 1104 may be configured to process video data received from camera/sensor module 1102A and to recognize objects in the real-time video, such as oncoming vehicles, road hazards, road lines, road signs, or other objects. A first interface 1118 communicates a processed video stream from GPU 1104 to control unit 1112 within vehicle headlamp 1106. Control unit 1112 may perform further adaption of the video stream to adjust pixel bit maps for use in driving pixels of LED driver/light source 1115. Control unit 1112, for example, may perform Gamma corrections on pixel values (although this could also be performed by an LED driver). Control unit 1112 may also down sample image-based bit maps to a resolution associated with a pixel array within LED driver/light source 1115. In this way, an image-based bit map, which may have been processed by GPU 1104 to adjust pixel values based on object detection, can be downsampled (or possibly upsampled) to create a bitmap with values defined for driving individual pixels within LED driver/light source 1115. Down sampling or upsampling may be needed so that the image-based bit map is adjusted to the same resolution as the pixel array of pixels within LED driver/light source 1115.

Communication between sensor modules 1102 and GPU 1104 may occur via typical automotive interfaces, such as a CAN bus. Body control module 1105 may control other light functions of from light module 1120, such as turn signals, DRLS, hazard lights, or other lighting features. In addition, body control module 1105 may provide main control and 12-volt power supply to vehicle headlamp 1106. Control unit 1112 may use the 12-volt power supply, and control unit 1112 may also level shift the 12 volt supply to a 5-volt supply that is delivered to LED driver/light source 1115. The communication interface between body control module 1105 and front light module 1120 may comprise a CAN bus, such as CAN FD. Moreover, the same CAN bus communication interface between body control module 1105 and front light module 1120 may also be used for communication between body control module 1105 and control unit 1112.

In contrast to first interface 1118, which communicates a processed video stream from GPU 1104 (outside of vehicle headlamp unit 1106) to control unit 1112 (inside of vehicle headlamp 1106), second interface 1116 is configured as a low cost interface that is still configured to provide reliable and effective video data communication between the control unit and LED driver/light source 1115. Second interface 1116 may be needed because of modular design and separation of the different modules. This disclosure appreciates the undesirability of wire routing and high costs associated with a high-speed video cable within vehicle headlamp 1106, and therefore, this disclosure describes a desirable low-cost interface for second interface 1116 that can support pixelated LED light systems that include 10,000-20,000 pixels. Of course, LEDs having a fewer number of pixels or a greater number of pixels can also benefit from the teachings of this disclosure. LED driver/light source 1115, for example, may comprise a matrix of individually controlled LEDs. In some cases, the matrix light source can be mounted on a separate printed circuit board relative to the LED driver due to high power constraints and space constraints, but this can add yet additional interfaces for which the low-cost interfaces described herein may be desirable.

In some examples, the system of FIG. 11 includes a circuit within vehicle headlamp 1106 that is configured to control the vehicle headlamp. The circuit may comprise LEDs and LED driver configured to drive the LEDs based at least in part on the video data (e.g., LED driver and light source 1115). The circuit may also include an LED controller (e.g. control unit 1112) configured to receive video data from a video source (e.g., GPU) via a first interface 1118. The circuit may also include a second interface 1116 between the LED controller (e.g. control unit 1112) and the LED driver (e.g., LED driver and light source 1115), and the second interface may be configured to the video data at a slower data rate than the first interface.

Figure 12:
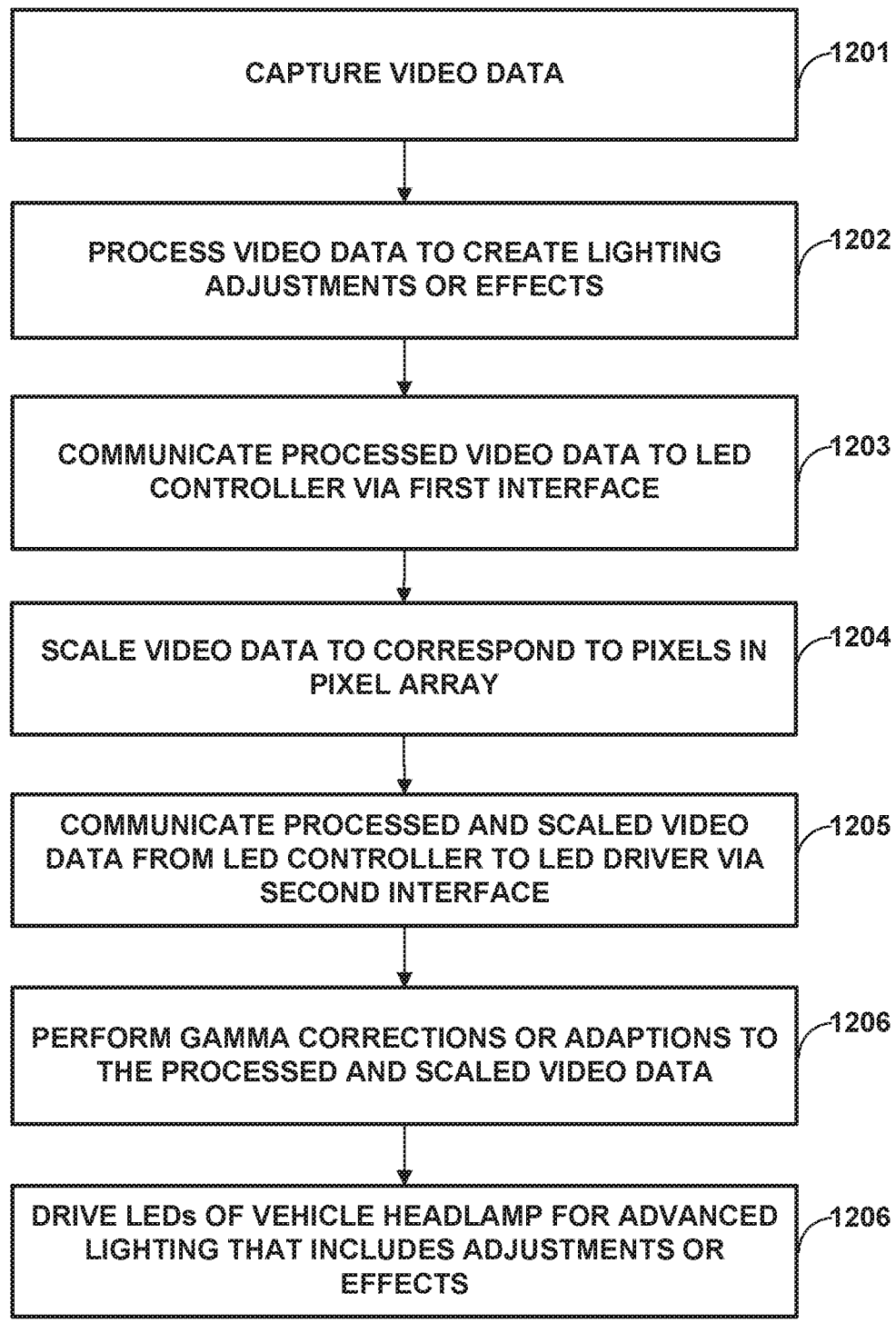
FIG. 12 is a flow diagram consistent with techniques performed by a vehicle according to this disclosure.

FIG. 12 is a flow diagram consistent with techniques performed by vehicle according to this disclosure. FIG. 12 will be described from the perspective of vehicle lighting system 100 of FIG. 1, although other systems could perform the techniques. The steps shown in FIG. 12 are exemplary, and not all steps are required for various examples.

As shown in FIG. 12, camera sensors 102 capture video data, which may comprise real-time video data of the front view of a vehicle (1201). GPU 104 processes the video data to create lighting adjustments or effects (1202). For example, GPU 104 may perform object detection to detect objects in the field of view and to adjust pixel data based on the detected objects. For example, GPU may adjust pixel data in a way that can ultimately achieve glare reductions perceived by the operators of other vehicles, enhance illumination of one or more objects, adjust or project visual aids or guiding elements in order to help the vehicle operator (e.g., to present guiding elements on the road), project one or more symbols, project guiding lines for the vehicle operator (e.g., to present guide lines on the road), shape light projected by the LEDs, reduce light intensity of a portion of light projected by the LEDs, present symbols, present images, present trademarks during vehicle start-up or vehicle idle, or achieve other effects. Such light adjustments may be performed by GPU 104 based on navigation information collected or presented by the vehicle, based on object detection, or based on other factors.

After processing the video data, GPU communicates the processed video data to LED controller 112 via a first interface 118 (1203), which may comprise a high speed video interface, a differential interface, or another high cost interface as discussed herein. LED controller 112 scales the video data to correspond to pixels within a pixel array of LEDs 108 (1204). For example, if the captured and processed image includes 40000 pixels, but the LED array only includes 20000 LEDs, then the 40000 pixel values may be down sampled to 20000 values so that the image can be used as a bit map for driving the 20000 LEDs. Of course, the number of pixels in the images and the number of pixels in the LED array may vary widely for a wide variety of implementations, so the amount of downsampling (or possibly up sampling) could vary widely in different implementations.

The processed and scaled video data is then communicated from LED controller 112 to LED driver 114 via second interface 116 (1205), which may comprise a low-cost interface described herein, such as a one wire interface that operates according to a master slave protocol. In the example process shown in FIG. 12, LED driver 114 performs Gamma corrections or adaptions on the video data (1206), and then LED driver 114 drives LEDs 108 for advanced lighting that includes adjustments or effects (1207), such as those described herein.

The following examples may illustrate one or more aspects of the disclosure.

Example 1

A circuit configured to control a vehicle headlamp comprising light emitting diodes (LEDs), the circuit comprising: an LED controller configured to receive video data from a video source via a first interface; an LED driver configured to drive the LEDs based at least in part on the video data; and a second interface between the LED controller and the LED driver, wherein the second interface is configured to communicate the video data from the LED controller to the LED driver and wherein the second interface communicates the video data at a slower data rate than the first interface.

Example 2

The circuit of example 1, wherein the LEDs comprise a matrix of individually controlled LEDs and wherein the LED driver is configured to control the intensity of different ones of the individually controlled LEDs based on the video data.

Example 3

The circuit of example 1 or 2, wherein the video data is real-time video data associated with a scene illuminated by the LEDs.

Example 4

The circuit of any of examples 1-3, wherein the video data received from the video source comprises processed video data that is based on raw video data and object detection.

Example 5

The circuit of any of examples 1-4, wherein the second interface comprises a one-wire uni-directional interface.

Example 6

The circuit of any of examples 1-5, wherein the first interface comprises a multi-wire differential interface.

Example 7

The circuit of any of examples 1-6, wherein the first interface communicates data video frame-by-video frame and the second interface communicates data row-by-row.

Example 8

The circuit of any of examples 1-7, wherein the LED driver is configured to adjust the video data and the LED driver is configured to drive the LEDs based at least in part on the adjusted video data.

Example 9

The circuit of any of examples 1-8, wherein the LED controller is configured to adjust the video data by performing a Gamma Correction process on the video data.

Example 10

The circuit of any of examples 1-8, wherein the LED driver is configured to perform a Gamma Correction process on the video data.

Example 11

The circuit of any of examples 1-10, wherein the first interface comprises one of: an ethernet interface; a gigabit multimedia serial link (GMSL) interface; a controller area network (CAN) bus interface; a controller area network-flexible data (CAN-FD) bus interface; an interface defined according to a FlexRay protocol; a link defined according to a low voltage differential signaling (LVDS) standard; and a controller area network-extra-large (CAN-XL) bus interface, and wherein the second interface comprises an interface that operates according to a master-slave protocol.

Example 12

The circuit of any of examples 1-11, wherein the first interface comprises a bi-directional interface.

Example 13

A headlamp unit for a vehicle, the headlamp unit comprising: a set of LEDs; and a circuit configured to control the LEDs, the circuit comprising: an LED controller configured to receive video data from a video source via a first interface; an LED driver configured to drive the LEDs based at least in part on the video data; and a second interface between the LED controller and the LED driver, wherein the second interface is configured to communicate the video data from the LED controller to the LED driver and wherein the second interface communicates the video data at a slower data rate than the first interface.

Example 14

The headlamp unit of example 13, wherein the LEDs comprise a matrix of individually controlled LEDs and wherein the LED driver is configured to control the intensity of different ones of the individually controlled LEDs based on the video data.

Example 15

The headlamp unit of example 13 or 14, wherein the video data received from the video source comprises processed video data that is based on raw video data and object detection.

Example 16

The headlamp unit of any of examples 13-15, wherein the second interface comprises a one-wire uni-directional interface.

Example 17

The headlamp unit of any of examples 13-16, wherein the first interface comprises a multi-wire differential interface.

Example 18

The headlamp unit of any of examples 13-17, wherein the LED driver is configured to adjust the video data and the LED driver is configured to drive the LEDs based at least in part on the adjusted video data.

Example 19

The headlamp unit of any of examples 13-18, wherein the LED driver is configured to perform a Gamma Correction process on the video data.

Example 20

The headlamp unit of any of examples 13-19, wherein the first interface comprises one of: an ethernet interface; a GMSL interface; a CAN bus interface; a CAN-FD bus interface; an interface defined according to a FlexRay protocol; a link defined according to a LVDS standard; and a CAN-XL bus interface, and wherein the second interface comprises an interface that operates according to a master-slave protocol.

Example 21

An adaptive vehicle lighting system comprising: one or more camera sensors configured to capture video data associated with a scene illuminated by the vehicle lighting system; a GPU that processes the video data; a first interface; and a headlamp unit comprising: a set of LEDs; and a circuit configured to control the LEDs, the circuit comprising: an LED controller configured to receive the processed video data from the GPU via the first interface; an LED driver configured to drive the LEDs based at least in part on the processed video data; and a second interface between the LED controller and the LED driver, wherein the second interface is configured to communicate the processed video data from the LED controller to the LED driver and wherein the second interface communicates at a slower data rate than the first interface.

Example 22

The system of example 21, wherein the LED driver is configured to adjust the processed video data and the LED driver is configured to drive the LEDs based at least in part on the processed and adjusted video data.

Example 23

The system of example 21 or 22, wherein the GPU performs object detection to process the video data and wherein the LED driver performs a Gamma Correction on the processed video data to adjust the processed video data.

Example 24

The system of any of examples 21-23, wherein the first interface comprises one of: an ethernet interface; a GMSL interface; a CAN bus interface; a CAN-FD bus interface; an interface defined according to a FlexRay protocol; a link defined according to a LVDS standard; and a CAN-XL bus interface, and wherein the second interface comprises an interface that operates according to a master-slave protocol.

Example 25

The system of any of examples 21-24, wherein the GPU processes the video data by performing one or more of the following steps on the video data: adjusting the video data based on navigation information; adjusting the video data to reduce glare of light projected by the LEDs based on object detection; adjusting the video data to enhance illumination of one or more objects illuminated by the LEDs based on object detection; adjusting the video data to project one or more guiding elements by the LEDs; adjusting the video data to project one or more symbols by the LEDs; adjusting the video data to project one or more guiding lines by the LEDs; adjusting the video data to shape light projected by the LEDs; and adjusting the video data to reduce intensity of at least a portion of light projected by the LEDs.

Example 26

A system comprising: a video signal source module comprising a video signal source and a first transceiver; a video signal receiver module comprising a second transceiver and a circuit configured to control LEDs; a first interface configured to communicate the video data between the video signal source module and the video signal receiver module from the first transceiver to the second transceiver; a second interface within the video signal source module, wherein the second interface is configured to communicate video data from the signal source to the first transceiver; and a third interface within the video signal receiver module, wherein the third interface is configured to communicate the video data from the second transceiver to the circuit, wherein the first interface communicates the video data at a faster data rate than the second interface, and wherein the first interface communicates the video data at a faster data rate than the third interface.

Example 27

The system of example 26, wherein the second and third interfaces are one-wire unidirectional interfaces that operate according to a master-slave protocol and wherein the first interface comprises a multi-wire differential interface.

Example 28

A method comprising: capturing video data, communicating the video data from outside of a vehicle headlamp to an LED controller within the vehicle headlamp via a first interface, and communicating the video data from the LED controller to an LED driver within the vehicle headlamp, wherein the second interface communicates the video data at a slower data rate than the first interface.

Example 29

The method of example 28, further comprising: processing the video data to create lighting effects or adjustments.

Example 30

The method of example 28 or 29, further comprising: scaling the video data to correspond to pixels in a pixel array.

Example 31

The method of any of examples 28-30, further comprising: performing gamma corrections or adaptions to the video data.

Example 32

The method of any of examples 28-31, further comprising: driving LEDs of a vehicle headlamp for advanced lighting that include adjustments or effects.

Various aspects have been described in this disclosure. These and other aspects are within the scope of the following claims.

The invention claimed is:

1. A circuit configured to control a vehicle headlamp comprising light emitting diodes (LEDs), the circuit comprising:
   an LED controller configured to receive video data from a video source via a first interface;
   an LED driver configured to drive the LEDs based at least in part on the video data; and
   a second interface between the LED controller and the LED driver, wherein the second interface consists of only a one-wire single-ended uni-directional interface that is configured to communicate the video data from the LED controller to the LED driver and wherein the second interface communicates the video data at a slower data rate than the first interface.

2. The circuit of claim 1, wherein the LEDs comprise a matrix of individually controlled LEDs and wherein the LED driver is configured to control the intensity of different ones of the individually controlled LEDs based on the video data.

3. The circuit of claim 1, wherein the video data is real-time video data associated with a scene illuminated by the LEDs.

4. The circuit of claim 1, wherein the video data received from the video source comprises processed video data that is based on raw video data and object detection.

5. The circuit of claim 1, wherein the first interface comprises a multi-wire differential interface.

6. The circuit of claim 1, wherein the first interface communicates data video frame-by-video frame and the second interface communicates data row-by-row.

7. The circuit of claim 1, wherein the LED driver is configured to adjust the video data and the LED driver is configured to drive the LEDs based at least in part on the adjusted video data.

8. The circuit of claim 1, wherein the LED controller is configured to adjust the video data by performing a Gamma Correction process on the video data.

9. The circuit of claim 1, wherein the LED driver is configured to perform a Gamma Correction process on the video data after receiving the video data over the second interface.

10. The circuit of claim 1, wherein the first interface comprises one of:
   an ethernet interface;
   a gigabit multimedia serial link (GMSL) interface;
   a controller area network (CAN) bus interface;
   a controller area network-flexible data (CAN-FD) bus interface;
   an interface defined according to a FlexRay protocol;
   a link defined according to a low voltage differential signaling (LVDS) standard; and
   a controller area network-extra-large (CAN-XL) bus interface, and
   wherein the second interface comprises an interface that operates according to a master-slave protocol.

11. The circuit of claim 1, wherein the LED controller and the LED driver are separate circuits within a vehicle headlamp unit, and the second interface connects the LED controller to the LED driver.

12. The circuit of claim 1, wherein the LED controller and the LED driver separate circuit packages within a vehicle headlamp unit, and the second interface connects the separate circuit packages.

13. A headlamp unit for a vehicle, the headlamp unit comprising:
   a set of light emitting diodes (LEDs); and
   a circuit configured to control the LEDs, the circuit comprising:
   an LED controller configured to receive video data from a video source via a first interface;
   an LED driver configured to drive the LEDs based at least in part on the video data; and
   a second interface between the LED controller and the LED driver, wherein the second interface consists of only a one-wire single-ended uni-directional interface that is configured to communicate the video data from the LED controller to the LED driver and wherein the second interface communicates the video data at a slower data rate than the first interface.

14. The headlamp unit of claim 13, wherein the LEDs comprise a matrix of individually controlled LEDs and wherein the LED driver is configured to control the intensity of different ones of the individually controlled LEDs based on the video data.

15. The headlamp unit of claim 13, wherein the video data received from the video source comprises processed video data that is based on raw video data and object detection.

16. The headlamp unit of claim 13, wherein the first interface comprises a multi-wire differential interface.

17. The headlamp unit of claim 13, wherein the LED driver is configured to adjust the video data and the LED driver is configured to drive the LEDs based at least in part on the adjusted video data.

18. The headlamp unit of claim 17, wherein the LED driver is configured to perform a Gamma Correction process on the video data after receiving the video data over the second interface.

19. The headlamp unit of claim 13, wherein the first interface comprises one of:
   an ethernet interface;
   a gigabit multimedia serial link (GMSL) interface;
   a controller area network (CAN) bus interface;
   a controller area network-flexible data (CAN-FD) bus interface;
   an interface defined according to a FlexRay protocol;
   a link defined according to a low voltage differential signaling (LVDS) standard; and
   a controller area network-extra-large (CAN-XL) bus interface,
   and wherein the second interface comprises an interface that operates according to a master-slave protocol.

20. An adaptive vehicle lighting system comprising:
   one or more camera sensors configured to capture video data associated with a scene illuminated by the vehicle lighting system;
   a graphics processing unit (GPU) that processes the video data;
   a first interface; and
   a headlamp unit comprising:
     a set of light emitting diodes (LEDs); and
     a circuit configured to control the LEDs, the circuit comprising:
     an LED controller configured to receive the processed video data from the GPU via the first interface;
     an LED driver configured to drive the LEDs based at least in part on the processed video data; and
     a second interface between the LED controller and the LED driver, wherein the second interface consists of only a one-wire single-ended uni-directional interface that is configured to communicate the processed video data from the LED controller to the LED driver and wherein the second interface communicates at a slower data rate than the first interface.

21. The system of claim 20, wherein the LED driver is configured to adjust the processed video data and the LED driver is configured to drive the LEDs based at least in part on the processed and adjusted video data.

22. The system of claim 21, wherein the GPU performs object detection to process the video data and wherein the LED driver performs a Gamma Correction on the processed video data to adjust the processed video data.

23. The system of claim 20, wherein the first interface comprises one of:
   an ethernet interface;
   a gigabit multimedia serial link (GMSL) interface;
   a controller area network (CAN) bus interface;
   a controller area network-flexible data (CAN-FD) bus interface;
   an interface defined according to a FlexRay protocol;
   a link defined according to a low voltage differential signaling (LVDS) standard; and
   a controller area network-extra-large (CAN-XL) bus interface,
   and wherein the second interface comprises an interface that operates according to a master-slave protocol.

24. The system of claim 20, wherein the GPU processes the video data by performing one or more of the following steps on the video data:
   adjusting the video data based on navigation information;
   adjusting the video data to reduce glare of light projected by the LEDs based on object detection;
   adjusting the video data to enhance illumination of one or more objects illuminated by the LEDs based on object detection;
   adjusting the video data to project one or more guiding elements by the LEDs;
   adjusting the video data to project one or more symbols by the LEDs;
   adjusting the video data to project one or more guiding lines by the LEDs;

adjusting the video data to shape light projected by the LEDs; and
  adjusting the video data to reduce intensity of at least a portion of light projected by the LEDs.

25. A system comprising:
  a video signal source module comprising a video signal source and a first transceiver;
  a video signal receiver module comprising a second transceiver and a circuit configured to control light emitting diodes (LEDs);
  a first interface configured to communicate the video data between the video signal source module and the video signal receiver module from the first transceiver to the second transceiver;
  a second interface within the video signal source module, wherein the second interface is configured to communicate video data from the signal source to the first transceiver; and
  a third interface within the video signal receiver module, wherein the third interface consists of only a one-wire single-ended uni-directional interface that is configured to communicate the video data from the second transceiver to the circuit configured to control the LEDs,
  wherein the first interface communicates the video data at a faster data rate than the second interface, and
  wherein the first interface communicates the video data at a faster data rate than the third interface.

26. The system of claim 25, wherein the second and third interfaces are both one-wire single-ended uni-directional interfaces that operate according to a master-slave protocol and wherein the first interface comprises a multi-wire differential interface.

* * * * *